Patented Dec. 25, 1951

2,580,048

UNITED STATES PATENT OFFICE 2,580,048

FUNGICIDAL EMULSION COMPRISING A COPPER SALT OF AN ALKYLATED PHENOXY ACETIC ACID

Albert J. Shmidl, Houston, Tex., assignor, by mesne assignments, to Standard Oil Development Company, Elizabeth, N. J., a corporation of Delaware No Drawing. Application April 12, 1948, Serial No. 20,590

4 Claims. (Cl. 167—30)

The present invention is directed to an improved fungicidal composition. More particularly, the invention is directed to an improved fungicide including an organic derivative of a copper salt.

This application is a continuation-in-part of co-pending application U. S. Serial No. 745,638, entitled "Improved Fungicide," filed May 2, 1947, now abandoned.

Copper salts have been used in agriculture for more than 100 years and their use is expected to continue at a high level because they are inexpensive, relatively easy to prepare, and the employment of these materials is firmly established in farm practices. Copper salts, both inorganic and organic, have become one of the more important of the economic poisons employed in agriculture in the continental United States. It has been variously estimated that the annual usage in the United States of copper compounds, such as copper sulfate, is about 115,000,000 pounds. It will be readily seen that the employment of copper compounds, particularly as an agricultural chemical, has reached important proportions.

The inorganic copper compounds, however, have one great disadvantage in that the copper, which is the active ingredient, is not always readily available to act as a poison to the various fungi and insects. Recourse has been made to organic copper compounds such as the available copper naphthenates. The naphthenic acids are in short supply and, therefore, are unable to fulfill the great demand at present.

It has now been discovered that a copper salt of a substituted phenoxy acid produced from petroleum phenols has improved fungicidal properties in combating peach brown rot and early blight of potatoes and tomatoes caused by *Sclerotinia fructiola* and *Alternaria solani*. The compound in question has also been found useful in suppressing the milkweed bug and as a combatant against the American and German roaches.

This compound may be characterized by the following structure:

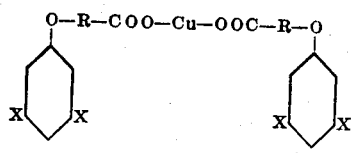

where X is an alkyl radical having from one to four carbon atoms in either the 2, 4, or other positions of the aromatic nucleus and RCOOCu is any aliphatic acid with a carboxyl acid H replaced by copper.

The improved fungicide of the present invention may ordinarily be employed as an aqueous suspension or it may be used as a powder and dusted on the vegetation or insects to be controlled. Alternatively, the improved fungicide may be used in an inorganic solvent or in an emulsion of an organic solvent and an aqueous solution and employed as an aerosol.

When the improved fungicide of the present invention is employed, it is preferred that it be applied as an emulsion containing the copper salt of petroleum phenoxyacetic acid, a wetting agent such as a sodium salt of an alkyl aryl sulfonic acid, a heavy substantially paraffinic oil boiling in the range between 400° and 750° F., and water. The active ingredient, of course, is the copper salt of petroleum phenoxyacetic acid while the wetting agent serves to maintain the emulsion and to cause spreading of the emulsion on the vegetation. The heavy oil prevents the active ingredient from being washed off the vegetation by dew or rainfall.

Wetting agents such as sodium sulfonates obtained by neutralization of sulfonated petroleum oils, sulfonation products of alcohols or dibasic acids, sulfonated castor oil and esters of sulfo compounds such as the dioctyl ester of sodium sulfosuccinate and the like may be used effectively in the practice of my invention.

The emulsion may effectively comprise from about 0.001 to 1% by weight or higher of the copper salt of petroleum phenoxyacetic acid, about 0.1 to 1.0% by weight of a wetting agent and about 0.1 to 1.5% by weight of a heavy paraffinic oil and the remainder water.

To emphasize the importance of the improved fungicide of the present invention, it was estimated by the United States Department of Agriculture in 1938 that the Irish potato blight resulted in the loss of 7,141,000 bushels of potatoes and 1,492,000 bushels of peaches. It may thus be seen that the present invention may allow appreciable savings by control of the fungi responsible for the decrease in crop yields.

The improved fungicide of the present invention may be prepared by extracting a high boiling, cracked petroleum fraction boiling in the range of 350° to 650° F. with a 30° to 50° Bé. sodium hydroxide solution in a quantity sufficient to form sodium salts of the phenols contained in the fraction. The phenols will be obtained as a thick, viscous layer on the surface of the sodium hydroxide solution as crude sodium phenolates. This layer is separated, diluted with water, and settled to remove any emulsified oil which may have been entrained in it. The oil-free sodium phenolates are then acidified with weak mineral acid to the extent that the phenols are liberated and strong organic acids, such as naphthenic acids, are retained in the soap. The liberated phenols are dried by heating to a temperature of about 300° F. The dry petroleum phenols are then distilled under reduced pressure and an overhead fraction boiling in the range from about 420° to 620° F. and amounting to about 60% by volume overhead is obtained. This fraction is then utilized to prepare the improved fungicide and insecticide of the present invention. The petroleum phenols are dissolved in 30% to 35% sodium hydroxide and slightly more than the theoretical quantity of chloroacetic acid is added to react with the phenols. The mixture is heated to a temperature of about 200° F. for about one hour. The reaction product is then cooled and acidified with a dilute acid. On acidification, an oily mixture separates which is taken up in diethyl ether and the ethereal solution is then washed with the 10% sodium carbonate solution. A mineral acid is added to the carbonate solution to adjust the pH thereof to about 8 to cause conversion to the petroleum phenoxyacetic acid. The pH of the solution to which mineral acid has been added should be carefully controlled and should be on the basic side but should not exceed a pH of about 9. Sufficient mineral acid to maintain a pH in the range from 8 to 9 will give good results. If an excess of hydroxyl ions are present, there is a tendency, when a copper salt is added, to form copper hydroxide rather than a copper salt of the phenoxyacetic acid. On the other hand, the copper salt of the phenoxy acetic acid will not form if the solution is acidic or substantially neutral.

An aqueous solution of a copper salt such as copper sulfate is then added to the solution having a pH in the range from about 8 to 9 to convert the petroleum phenoxyacetic acid to the copper salt. Water and the slight excess of copper are withdrawn and the copper phenoxy derivative is then dissolved in a suitable solvent such as ether or an aromatic hydrocarbon as illustrated by benzene and toluene. The solvent may be removed by evaporation to obtain the dry salt. However, it may be desirable to employ the metal salt of the phenoxyacetic acid in a solution so that it may evaporate and leave an evenly distributed film of the organic copper salt on the vegetation or the area to be protected against fungi and insects.

Besides having the copper available as a fungicide and insecticide, the petroleum phenols from which the copper salts of the phenoxyacetic acid are prepared has a high phenol coefficient which in itself contributes to the useful nature of the improved fungicide and insecticide of the present invention.

A fungicide prepared in the foregoing manner was tested to determine its fungicidal properties to *Alternaria solani* and *Sclerotinia fructiola*. These fungi are the cause of early blight on potatoes and tomatoes and the appearance of brown rot on peaches, respectively. The test method employed has been described by Horsfall, "Fungicides and Their Action," The Chronica Botanica Co., Waltham, Massachusetts, 1945, in which the amount of fungicides necessary to obtain 50% mortality is determined.

In the particular technique employed, a culture of the common test organisms was maintained in the laboratory under sterile conditions. The slide germination method, which is widely used in botanical investigations, was employed as the test method. In this technique fungus spores obtained under controlled conditions as regards species, strains, medium, age, temperature and concentration and stimulant, if desired, are suspended in distilled water. Aliquots of this suspension are pipetted into dilutions or suspensions of the chemical to be tested. Droplets of the resulting mixture are pipetted onto 1 by 3 inch glass slides. These are placed in moist chambers which are sealed with water and held at a temperature suitable for germination. After 20 hours the slides are removed from the moist chambers and the droplets examined under a low power microscope. The percentage spores inhibited from germinating, based on one hundred spores counted from each drop, are recorded. Ordinarily, in testing a single compound, it is usually desirable to make several thousand spore counts.

It was found on determining the fungicidal properties of the improved fungicide of the present invention that a solution of less than 0.001% of the copper salt allowed only 50% germination. A similar test was carried out on *Sclerotinia fructiola*. These results show that the copper derivative of the phenoxyacetic acid prepared from petroleum phenols has improved fungicidal properties.

The improved fungicide and insecticide of the present invention was then tested on milkweed bug by immersing specimens of the bug for two minutes in a 0.25% solution or suspension of the improved fungicide and insecticide of the present invention. A mortality of 85% was observed for the milkweed bug.

Similar tests with a suspension of the same concentration were performed on specimens of the German roach. In this test, 100% mortality of the German roach was obtained.

The toxicity of the compound of the present invention was then tested on the American roach by injecting in the blood stream of male and female specimens 0.5 mg. of the compound per gram of insect weight. It was found that in the blood stream injection a mortality of 100% was obtained on the female American roach whereas only 20% was obtained on the male American roach.

Tests were also made on the effect of the compound of the present invention on green plants. On applying it to the foliage of coleus in 0.2% concentration, no immediate injury was noted after one day exposure.

I have found that other salts such as the zinc salts are not suitable for use in this invention. In one example, 0.05 pound of dichlorophenoxy acetic acid was dissolved in one gallon of water. This aqueous solution of dichlorophenoxy acetic acid was then admixed with 2.5% by weight of zinc chloride. No reaction product was obtained. By adjusting the pH of the aqueous solution to about 8.0, a metal salt was formed which contained approximately 5.5% by weight of zinc. This salt was insoluble in the solution and floated on the surface thereof. The theoretical amount of zinc in the salt of dichlorophenoxy acetic acid is 14.8% by weight, the foregoing analysis indicating that incomplete reaction occurred. On adding an excess of sodium hydroxide, the salt remained stable and did not dissolve.

As another example, phenoxy acetic acid dissolved in one gallon of water in an amount of 0.05 pound was admixed with 2.5% by weight of zinc chloride based on the aqueous solution. No precipitate formation occurred. By adjusting the pH of the solution to about 8.0, a slight precipitate was formed which was believed to be zinc hydroxide since it dissolved in excess caustic when the latter was added thereto.

It will be noted that in the reaction when zinc chloride was mixed with the dichlorophenoxy acetic acid the metal salt was formed whereas when zinc chloride was admixed with the phenoxyacetic acid, no reaction between the zinc chloride and phenoxyacetic acid was observed. It is noteworthy that the presence of chlorine in the molecule influenced the reaction of the phenoxy acetic acid compound with the salt. Similarly, in the present invention the presence of alkyl radicals on the ring allows the reaction to proceed. It is believed that the presence of chlorine in the molecule increases the acidity of the compound and allows the reaction to go substantially to completion with the zinc salt. A similar effect is postulated for the petroleum phenoxy acetic acid. The presence of alkyl groups in the petroleum phenoxyacetic acid is believed to confer sufficient acidity to the petroleum phenoxyacetic acid to allow the reaction to proceed with a copper salt but insufficient to react with the zinc salt.

The petroleum phenoxyacetic acid obtained as described above was then admixed with water in an amount of about 0.05 pound per gallon of water and to it was added 2.5% by weight of zinc chloride. In this particular instance, no reaction of the zinc salt with the petroleum phenoxy acetic acid was observed in the substantially neutral solution or in the solution having its pH adjusted to about 8.0 thus confirming the above postulate.

These results show that the phenoxyacetic acid must have directive groups in the molecule to allow reaction to proceed and also further shows that an alkaline solution is necessary for the reaction. This is indeed surprising since the effect of the chlorine in the molecule is to influence the reaction with zinc chloride as shown in the foregoing example whereas no reaction was observed with the phenoxyacetic acid derived from petroleum phenols.

It is apparent from the foregoing examples that the compound of the present invention prepared from petroleum phenols has improved toxicity against fungi and insects and does not exert any damage to foliage. Thus, it may be possible to spray or otherwise apply suspensions or solutions of the compound of the present invention to foliage and thus assure protection against fungi and insects of the type mentioned.

It may be possible to suppress the infestation of domestic dwellings against roaches by applying to the premises suspensions or solutions of the improved composition of the present invention. While spraying or coating will be the usual way to apply the improved fungicide and insecticide, it will be apparent that it may be painted or otherwise applied to surfaces which are to be protected against destruction by fungi and insects. Leather goods, cellulosic material and the like which are susceptible to destruction by fungi may be immersed or coated with solutions of the improved fungicide and insecticide and protected against damage. During hostilities of the last World War, in some instances untreated tents, shoes, and clothing would disintegrate within a week in the Pacific war area due to the action of fungi. Thus, the destructive action of such fungi may be prevented by coating the surfaces exposed to attack with the improved composition.

The nature and objects of the present invention having been fully described and illustrated, what I wish to claim as new and useful and to secure by Letters Patent is:

1. An emulsion suitable for controlling the growth of fungus on plants in an active state of growth which consists of an intimate admixture of a copper salt of an alkylated phenoxy acetic acid characterized by having at least one alkyl radical on the aromatic nucleus, said radical having from one to four carbon atoms, said aromatic nucleus being free from substituent groups other than said alkyl radical, a wetting agent, a heavy oil, and water.

2. An emulsion in accordance with claim 1 in which the alkylated phenoxy acetic acid has two alkyl radicals in the 2 and 4 positions on the aromatic nucleus.

3. An emulsion suitable for controlling the growth of fungus on plants in an active state of growth which consists of an intimate admixture of a copper salt of an alkylated phenoxy acetic acid characterized by having at least one alkyl radical on the aromatic nucleus, said radical having from one to four carbon atoms, said aromatic nucleus being free from substituent groups other than said alkyl radical, in an amount in the range between 0.001 to 1.0% by weight, sodium sulfonates in an amount in the range between 0.01 and 1.0% by weight, a heavy oil boiling in the range between 400° and 750° F. in an amount in the range between 0.1 and 1.5% by weight, and the remainder water.

4. An emulsion in accordance with claim 3 in which the alkylated phenoxy acetic acid has two alkyl radicals in the 2 and 4 positions on the aromatic nucleus.

ALBERT J. SHMIDL.

REFERENCES CITED

The following references are of record in the file of this patent:

UNITED STATES PATENTS

| Number | Name | Date |
|---|---|---|
| 1,933,520 | Bruson | Oct. 30, 1933 |
| 2,284,065 | Myers | May 26, 1942 |
| 2,299,604 | Weirich | Oct. 20, 1942 |
| 2,390,941 | Jones | Dec. 11, 1945 |
| 2,449,787 | Meyer | Sept. 21, 1948 |
| 2,453,983 | Sexton et al. | Nov. 16, 1948 |

FOREIGN PATENTS

| Number | Country | Date |
|---|---|---|
| 574,274 | Great Britain | Dec. 31, 1945 |

OTHER REFERENCES

Synerholm et al.: Contributions from Boyce Thompson Institute, vol. 14, No. 3, Oct.–Dec. 1945, pp. 91–103. 71-2.6.